United States Patent
Liu et al.

(10) Patent No.: US 10,860,411 B2
(45) Date of Patent: Dec. 8, 2020

(54) AUTOMATICALLY DETECTING TIME-OF-FAULT BUGS IN CLOUD SYSTEMS

(71) Applicant: Futurewei Technologies, Inc., Plano, TX (US)

(72) Inventors: Haopeng Liu, Beijing (CN); Xu Wang, Beijing (CN); Guangpu Li, Chicago, IL (US); Shan Lu, Chicago, IL (US); Feng Ye, Mississauga (CA); Chen Tian, Union City, CA (US); Shen Chi Chen, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 114 days.

(21) Appl. No.: 15/938,841

(22) Filed: Mar. 28, 2018

(65) Prior Publication Data

US 2019/0303233 A1 Oct. 3, 2019

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0757* (2013.01); *G06F 11/1438* (2013.01);
(Continued)

(58) Field of Classification Search
CPC ............. G06F 11/0757; G06F 11/0793; G06F 11/1438; G06F 11/1464; G06F 11/3495
See application file for complete search history.

(56) References Cited

U.S. PATENT DOCUMENTS 8,510,304 B1* 8/2013 Briggs ............... G06F 16/22
707/736
8,862,942 B2* 10/2014 Jalbert ............... G06F 11/3632
714/11

(Continued)

FOREIGN PATENT DOCUMENTS

CN 103645961 A 3/2014
WO 2004025514 A2 3/2004

OTHER PUBLICATIONS

Deng et al, Fixing, preventing, and recovering from concurrency bugs, 2015. (Year: 2015).*

(Continued)

*Primary Examiner* — Elmira Mehrmanesh
(74) *Attorney, Agent, or Firm* — Conley Rose, P.C.

(57) ABSTRACT

A method implemented by a network element (NE) in a distributed system, the method comprising tracing an execution of a program in the distributed system to produce a record of the execution of the program, wherein the record indicates states of shared resources at various times during the execution of the program, identifying a vulnerable operation that occurred during the program execution based on the record, wherein the record indicates that a first shared resource of the shared resources is in a flawed state after a node that caused the first shared resource to be in the flawed state crashed, and determining that the vulnerable operation results in a time of fault (TOF) bug based on performing a fault-tolerance mechanism.

17 Claims, 8 Drawing Sheets

(51) Int. Cl.
G06F 11/14 (2006.01)
G06F 11/34 (2006.01)
G06F 21/57 (2013.01)
G06F 16/27 (2019.01)
H04L 29/08 (2006.01)

(52) U.S. Cl.
CPC ...... *G06F 11/1464* (2013.01); *G06F 11/3495* (2013.01); *G06F 16/27* (2019.01); *G06F 21/577* (2013.01); *H04L 67/1097* (2013.01)

(56) References Cited

U.S. PATENT DOCUMENTS

| | | | | |
|---|---|---|---|---|
| 8,966,453 | B1* | 2/2015 | Zamfir | G06F 11/3604 |
| | | | | 714/38.1 |
| 9,176,834 | B2* | 11/2015 | Griffith | G06F 11/2048 |
| 9,235,497 | B2* | 1/2016 | Ma | G06F 11/3688 |
| 9,501,340 | B2* | 11/2016 | Dautenhahn | G06F 9/30145 |
| 9,720,753 | B2 | 8/2017 | Joshi et al. | |
| 2009/0235262 | A1 | 9/2009 | Ceze et al. | |
| 2010/0107017 | A1* | 4/2010 | Munjal | G06F 11/0715 |
| | | | | 714/49 |
| 2010/0125758 | A1* | 5/2010 | Yang | G06F 11/362 |
| | | | | 714/45 |
| 2010/0169888 | A1 | 7/2010 | Hare et al. | |
| 2011/0093745 | A1 | 4/2011 | Zlotnik et al. | |
| 2011/0131550 | A1* | 6/2011 | Burckhardt | G06F 11/3632 |
| | | | | 717/124 |
| 2011/0219208 | A1 | 9/2011 | Asaad et al. | |
| 2012/0124431 | A1* | 5/2012 | Bauer | H04L 41/0663 |
| | | | | 714/55 |
| 2012/0151271 | A1* | 6/2012 | Ganai | G06F 11/3612 |
| | | | | 714/38.1 |
| 2012/0167162 | A1 | 6/2012 | Raleigh et al. | |
| 2012/0174074 | A1* | 7/2012 | Ganai | G06F 8/314 |
| | | | | 717/126 |
| 2012/0278658 | A1 | 11/2012 | Han et al. | |
| 2013/0232118 | A1 | 9/2013 | Reid et al. | |
| 2014/0033174 | A1 | 1/2014 | Farchi et al. | |
| 2014/0380101 | A1* | 12/2014 | Yu | G06F 11/3636 |
| | | | | 714/38.1 |
| 2015/0019901 | A1* | 1/2015 | Griffith | G06F 11/2048 |
| | | | | 714/4.11 |
| 2015/0081243 | A1 | 3/2015 | Ganai et al. | |
| 2015/0134795 | A1 | 5/2015 | Theimer et al. | |
| 2015/0161030 | A1* | 6/2015 | Wu | G06F 8/70 |
| | | | | 717/127 |
| 2016/0224447 | A1 | 8/2016 | Makao | |
| 2016/0283345 | A1 | 9/2016 | Gounares et al. | |
| 2016/0306922 | A1 | 10/2016 | van Rooyen et al. | |
| 2016/0364315 | A1* | 12/2016 | Lee | G06F 11/3632 |
| 2017/0039371 | A1 | 2/2017 | Lukacs et al. | |
| 2017/0123929 | A1 | 5/2017 | Helleren | |
| 2017/0177737 | A9 | 6/2017 | Hu et al. | |
| 2017/0193012 | A1* | 7/2017 | Gupta | G06F 11/1471 |
| 2017/0242414 | A1 | 8/2017 | Coote | |
| 2018/0046565 | A1* | 2/2018 | Lu | G06F 11/3632 |

OTHER PUBLICATIONS

Bertot, Y., et al., "Interactive Theorem Proving and Program Development," Coq'Art: The Calculus of Inductive Constructions, ISBN:3540208542, 2004, 508 pages.
Lamport, L., "Specifying Systems: The TLA+ Language and Tools for Hardware and Software Engineers," ISBN:032114306X, 2002, 381 pages.
Alagappan, R., et al., "Correlated Crash Vulnerabilities," USENIX Symposium on Operating Systems Design and Implementation, Nov. 2-4, 2016, pp. 151-167.
Alvaro, P., et al., "Automating Failure Testing Research at Internet Scale," SoCC '16 Proceedings of the Seventh ACM Symposium on Cloud Computing, Oct. 5-7, 2016, 12 pages.
Alvaro, P., "Lineage-driven Fault Interjection," SIGMOD, May 31-Jun. 4, 2015, 16 pages.
Bhandari, K., et al., "Makalu: Fast Recoverable Allocation of Non-volatile Memory," Proceedings of the 2016 ACM SIGPLAN International Conference on Object-Oriented Programming, Systems, Languages, and Applications, Nov. 2-4, 2016, 18 pages.
Brutschy, L., et al., "Serializability for Eventual Consistency: Criterion, Analysis, and Applications," Proceedings of the 44th ACM SIGPLAN Symposium on Principles of Programming Languages, Jan. 15-21, 2017, 15 pages.
Chen, F., et al., "jPredictor: A Predictive Runtime Analysis Tool for Java," ACM/IEEE 30th International Conference on Software Engineering, May 10-18, 2008, pp. 221-230.
Datapath.io, "Recent AWS outage and how you could have avoided downtime," Mar. 9, 2017, 6 pages.
Dean, J., "Designs, Lessons and Advice from Building Large Distributed Systems," Google, Keynote from LADIS, 2009, 73 pages.
Deligiannis, P., et al., "Asynchronous Programming, Analysis and Testing with State Machines," Proceedings of the 36th ACM SIGPLAN Conference on Programming Language Design and Implementation, Jun. 13-17, 2015, 11 pages.
Ganesan, A., et al., "Redundancy Does Not Imply Fault Tolerance: Analysis of Distributed Storage Reactions to Single Errors and Corruptions," Proceedings of the 15th USENIX Conference on File and Storage Technologies, Feb. 27-Mar. 2, 2017, pp. 149-165.
Gunawi, H., et al., "Fate and Destini: A Framework for Cloud Recovery Testing," Proceedings of the 8th USENIX Symposium on Networked Systems Design and Implementation, Mar. 2011, 14 pages.
Gunawi, H., et al., "EIO: Error Handling is Occasionally Correct," 6th USENIX Conference on File and Storage Technologies, Dec. 2008, pp. 207-222.
Guo, H., et al., "Practical Software Model Checking via Dynamic Interface Reduction," Proceedings of the Twenty-Third ACM Symposium on Operating Systems Principles, Oct. 23-26, 2011, 14 pages.
Guo, Z., et al., "Failure Recovery: When the Cure Is Worse Than the Disease," Proceedings of the 14th USENIX conference on Hot Topics in Operating Systems, May 2013, 6 pages.
Hawblitzel, C., et al., "IronFleet: Proving Practical Distributed Systems Correct," Proceedings of the ACM Symposium on Operating Systems Principles, Oct. 4-7, 2015, 17 pages.
Huang, R., et al., "Non-Race Concurrency Bug Detection Through Order-Sensitive Critical Sections," Proceedings of the 40th Annual International Symposium on Computer Architecture, Jun. 23-27, 2013, 12 pages.
"WalaWiki," http://wala.sourceforge.net/wiki/index.php/Main_page, Mar. 5, 2018, 2 pages.
"Javassist," http://jboss-javassist.github.io/javassist, Mar. 5, 2018, 2 pages.
Joshi, P., et al., "Setsudo: Perturbation-based Testing Framework for Scalable Distributed Systems," Proceeding of the Conference on Timely Results in Operating Systems, Nov. 3, 2013, 14 pages.
Killian, C., et al., "Life, Death, and the Critical Transition: Finding Liveness Bugs in Systems Code," Proceedings of the 4th USENIX conference on Networked Systems Design & Implementation, Apr. 11-13, 2007, pp. 243-256.
Kolli, A., et al., "High-Performance Transactions for Persistent Memories," High-Performance Transactions for Persistent Memories, Apr. 2-6, 2016, 13 pages.
Koskinen, E., et al., "Reducing Crash Recoverability to Reachability," Proceedings of the 43rd Annual ACM SIGPLAN-SIGACT Symposium on Principles of Programming Languages, Jan. 20-22, 2016, pp. 97-108.
Laadan, O., et al., "Pervasive Detection of Process Races in Deployed Systems," Proceedings of the Twenty-Third ACM Symposium on Operating Systems Principles, Oct. 23-26, 2011, pp. 353-367.
Lamport, L., "Time, Clocks, and the Ordering of Events in a Distributed Systems," Communications of the ACM, vol. 21, No. 7, Jul. 1978, pp. 558-565.

(56) References Cited

OTHER PUBLICATIONS

Lantz, P., et al., "Yat: A Validation Framework for Persistent Memory Software," Proceedings of USENIX ATC '14: 2014 USENIX Annual Technical Conference, Jun. 19-20, 2014, 7 pages.

Leesatapornwongsa, T., et al., "SAMC: Semantic-Aware Model Checking for Fast Discovery of Deep Bugs in Cloud Systems," 11th USENIX Symposium on Operating Systems Design and Implementation, Oct. 6-8, 2014, 17 pages.

Leesatapornwongsa, T., et al., "TaxDC: A Taxonomy of Non-Deterministic Concurrency Bugs in Datacenter Distributed System," Proceedings of the 21th ACM International Conference on Architectural Support for Programming Languages and Operating Systems, Apr. 2-6, 2016, 14 pages.

Li, K., et al., "ReproLite: A Lightweight Tool to Quickly Reproduce Hard System Bugs," Proceedings of the ACM Symposium on Cloud Computing, Nov. 3-5, 2014, 13 pages.

Liu, H., "DCatch: Automatically Detecting Distributed Concurrency Bugs in Cloud Systems," Proceedings of the Twenty-Second International Conference on Architectural Support for Programming Languages and Operating Systems, Apr. 8-12, 2017, 15 pages.

"Businesses Loosing $700 Billion a Year to IT Downtime, Says IHS I IHS Online Newsroom," Jan. 25, 2016, 4 pages.

Mashitzadeh, A., et al., "Towards Practical Default-On Multi-Core Record/Replay," Proceedings of the Twenty-Second International Conference on Architectural Support for Programming Languages and Operating Systems, Apr. 8-12, 2017, 16 pages.

Netzer, R., et al., "Improving the Accuracy of Data Race Detection," Proceedings of the third ACM SIGPLAN symposium on Principles and practice of parallel programming, Apr. 21-24, 1991, pp. 133-144.

"VirtualBox—Oracle VM VirtualBox," Mar. 5, 2018, 1 page.

Pelley, S., et al., "Memory Persistency," Proceeding of the 41st annual international symposium on Computer architecuture, Jun. 14-18, 2014, pp. 265-276.

Rubio-Gonzalez, C., et al., "Error Propagation Analysis for File Systems," Proceedings of the 30th ACM SIGPLAN Conference on Programming Language Design and Implementation, Jun. 15-20, 2009, 11 pages.

Saha, S., et al., "Hector: Detecting Resource-Release Omission Faults in Error-Handling Code for Systems Software," 43rd Annual IEEE/IFIP International Conference on Dependable Systems and Networks, Jun. 24-27, 2013, 12 pages.

Savage, S., et al., "Eraser: A Dynamic Data Race Detector for Multithreaded Programs," ACM Transactions on Computer Systems, vol. 15, No. 4, Nov. 1997, pp. 391-411.

Simsa, J., et al., "dBug: Systematic Evaluation of Distributed Systems," Proceedings of the 5th international conference on Systems software verification, Oct. 6-7, 2010, 9 pages.

Tian, C., et al., "Dynamic Recognition of Synchronization Operations for Improved Data Race Detection," Proceedings of the 2008 international symposium on Software testing and analysis, Jul. 20-24, 2008, 11 pages.

Volos, H., et al., "Mnemosyne: Lightweight Persistent Memory," Proceedings of the sixteenth international conference on Architectural support for programming languages and operating systems, Mar. 5-11, 2011, 13 pages.

Wilcox, J., et al., "Verdi: A Framework for Implementing and Formally Verifying Distributed Systems," Proceedings of the 36th ACM SIGPLAN Conference on Programming Language Design and Implementation, Jun. 13-17, 2015, pp. 357-368.

Xiong, W., et al., "Ad Hoc Synchronization Considered Harmful," Proceedings of the 9th USENIX conference on Operating systems design and implementation, Oct. 4-6, 2010, 14 pages.

Yang, J., et al., "MoDist: Transparent Model Checking of Unmodified Distributed Systems," 6th USENIX Symposium on Networked Systems Design and Implementation, pp. 213-228.

Yang, J., "EXplode: a Lightweight, General System for Finding Serious Storage System Errors," Proceedings of the 7th USENIX Symposium on Operating Systems Design and Implementation, vol. 7, Nov. 6-8, 2006, 16 pages.

Yang, J., et al., "Using Model Checking to Find Serious File System Errors," 6th Symposium on Operating Systems Design and Implementation, vol. 24, No. 4, Nov. 2006, pp. 273-287.

Yuan, D., et al., "Simple Testing Can Prevent Most Critical Failures: An Analysis of Production Failures in Distributed Data-intensive Systems," 11th USENIX Symposium on Operating Systems Design and Implementation, Oct. 6-8, 2014, pp. 249-265.

Zheng, M., et al., "Tourturing Databases for Fun and Profit," Proceedings of the 11th USENIX Symposium on Operating Systems Design and Implementation, Oct. 6-8, 2014, pp. 449-464.

"FCatch: Automatically detecting time-of-fault bugs in cloud systems," ASPLOS Submission #376, 2018, 14 pages.

Machine Translation and Abstract of Chinese Publication No. CN103645961, Mar. 19, 2014, 9 pages.

"An Effect-Oriented Approach to Concurrency-Bug Detection and Recovery," CERES—Center for Unstoppable Computing, The University of Chicago, 2017, 77 pages.

Leesatapornwongsa, et al., "TaxDC: A Taxonomy of Non-Deterministic Concurrency Bugs in Datacenter Distributed Systems," Proceedings of the 21th ACM International Conference on Architectural Support for Programming Languages andOperating Systems (ASPLOS '16), 2016, 14 pages.

Burckhardt, et al., "A Randomized Scheduler with Probabilistic Guarantees of Finding Bugs," ASPLOS'10, Mar. 13-17, 2010, Pittsburgh, Pennsylvania, USA., 12 pages.

Flanagan, et al., "Dynamic Partial-Order Reduction for Model Checking Software," POPL'05, Jan. 12-14, 2005, Long Beach, California, USA, pp. 1-12.

"Exploring the Challenges and Opportunities of Cloud Stacks in Dynamic Resource Environments," IEEE Computer Society, Feb. 8, 2018, 3 pages.

Leesatapornwongsa, et al., "Scalability Bugs: When 100-Node Testing is Not Enough," HotOS '17, May 8-10, 2017, Whistler, BC, Canada, 6 pages.

Deligiannis, et al. "Uncovering Bugs in Distributed Storage Systems during Testing (Not in Production!)," Proceedings of the 14th USENIX Conference on File and Storage Technologies (FAST '16), Feb. 22-25, 2016, Santa Clara, CA, USA, 15 pages.

Kasikci, et al., "Lazy Diagnosis of In-Production Concurrency Bugs," SOSP '17, Oct. 28, 2017, Shanghai, China, 17 pages.

Gunawi, et al., "Why Does the Cloud Stop Computing? Lessons from Hundreds of Service Outages," SoCC '16, Oct. 5-7, 2016, Santa Clara, CA, USA., 16 pages.

"Understanding cloud computing," Redhat, https://www.redhat.com/en/topics/cloud, downloaded from the Internet Feb. 2, 2018, pp. 1-13.

Farchi, et al., "Concurrent Bug Patterns and How to Test Them," IEEE, 2003, 7 pages.

Wuhib, et al., "Dynamic Resource Allocation with Management Objectives—Implementation for an OpenStack Cloud," 8th International Conference on Network and Service Management (CNSM 2012): Mini-Conference, 2012, pp. 309-315.

Foreign Communication From A Counterpart Application, International Application No. PCT/CN2017/096505, International Search Report dated Nov. 8, 2017, 3 pages.

Office Action dated Aug. 9, 2018, 42 pages, U.S. Appl. No. 15/668,469, filed Aug. 3, 2017.

Office Action dated Feb. 26, 2019, 43 pages, U.S. Appl. No. 15/668,469, filed Aug. 3, 2017.

Office Action dated May 2, 2019, 31 pages, U.S. Appl. No. 15/962,873, filed Apr. 25, 2018.

* cited by examiner

AUTOMATICALLY DETECTING TIME-OF-FAULT BUGS IN CLOUD SYSTEMS

TECHNICAL FIELD

The disclosure is related to the technical field of database systems, in particular distributed database systems.

BACKGROUND

Distributed systems have become the backbone of computing, and the reliability of distributed systems has become increasingly crucial. When a distributed system located at a cloud computing environment undergoes a cloud outage of a few minutes, such an outage can easily cost a company millions of dollars. Therefore, the reliability and availability of distributed systems largely hinges on how well common component failures, such as node crashes and message drops, can be tolerated and recovered. Distributed system developers often cannot anticipate unexpected faults and hence typically mishandle certain common component failures.

SUMMARY

In accordance with an example embodiment, a method implemented by a network element (NE) in a distributed system is provided. The method includes tracing, by a processor of the NE, an execution of a program in the distributed system to produce a record of the execution of the program, wherein the record indicates states of shared resources at various times during the execution of the program, identifying, by the processor of the NE, a vulnerable operation that occurred during the program execution based on the record, wherein the record indicates that a first shared resource of the shared resources is in a flawed state after a node that caused the first shared resource to be in the flawed state crashed, and determining, by the processor of the NE, that the vulnerable operation results in a time of fault (TOF) bug based on performing a fault-tolerance mechanism.

Optionally, in any of the preceding embodiments, the record indicates that the vulnerable operation is protected by the fault-tolerance mechanism.

Optionally, in any of the preceding embodiments, the vulnerable operation comprises a sequence of actions excluding a state correction action that restores a state of the first shared resource to an accessible state.

Optionally, in any of the preceding embodiments, the vulnerable operation occurs when the node in the distributed system leaves the first shared resource in the flawed state before the node crashes.

Optionally, in any of the preceding embodiments, the vulnerable operation occurs when the node in the distributed system recovers as a recovery node after maintaining the first shared resource in the flawed state.

Optionally, in any of the preceding embodiments, the fault-tolerance mechanism is a timeout mechanism.

Optionally, in any of the preceding embodiments, the record indicates that the vulnerable operation is not protected by the fault-tolerance mechanism.

In accordance with an example embodiment, an apparatus implemented as a NE is provided. The apparatus includes a memory storage comprising instructions, and one or more processors in communication with the memory storage, wherein the one or more processors execute the instructions to trace an execution of a program in the distributed system to produce a record of the execution of the program, wherein the record indicates states of shared resources at various times during the execution of the program, identify a vulnerable operation that occurred during the program execution based on the record, wherein the record indicates that a first shared resource of the shared resources is in a flawed state after a node that caused the first shared resource to be in the flawed state crashed, and determine that the vulnerable operation results in a time of fault (TOF) bug based on performing a fault-tolerance mechanism.

Optionally, in any of the preceding embodiments, the record indicates that the vulnerable operation is protected by the fault-tolerance mechanism.

Optionally, in any of the preceding embodiments, the vulnerable operation comprises a sequence of actions excluding a state correction action that restores a state of the first shared resource to an accessible state.

Optionally, in any of the preceding embodiments, the vulnerable operation occurs when the node in the distributed system leaves the first shared resource in the flawed state before the node crashes.

Optionally, in any of the preceding embodiments, the vulnerable operation occurs when the node in the distributed system recovers as a recovery node after maintaining the first shared resource in the flawed state.

Optionally, in any of the preceding embodiments, the vulnerable operation comprises executing a write command on the first shared resource followed by a read command performed on the first shared resource, wherein the write command is performed by a first node in the distributed system, wherein the read command is performed by a second node in the distributed system, and wherein the first node and the second nodes are different nodes in the distributed system.

Optionally, in any of the preceding embodiments, the vulnerable operation comprises executing a write command performed on the first shared resource followed by a read command performed on the first shared resource, wherein the write command is performed by the node in the distributed system, and wherein the read command is performed by the node after restarting the node.

In accordance with an example embodiment, a non-transitory medium configured to store a computer program product is provided. The non-transitory medium configured to store a computer program product comprises computer executable instructions that when executed by a processor cause the processor to trace an execution of a program in the distributed system to produce a record of the execution of the program, wherein the record indicates states of shared resources at various times during the execution of the program, identify a vulnerable operation that occurred during the program execution based on the record, wherein the record indicates that a first shared resource of the shared resources is in a flawed state after a node that caused the first shared resource to be in the flawed state crashed, determine that the vulnerable operation results in a time of fault (TOF) bug based on performing a fault-tolerance mechanism.

Optionally, in any of the preceding embodiments, the record indicates that the vulnerable operation is protected by the fault-tolerance mechanism.

Optionally, in any of the preceding embodiments, the vulnerable operation comprises sequence of actions excluding a state correction action that restores a state of the first shared resource to an accessible state.

Optionally, in any of the preceding embodiments, the vulnerable operation occurs when the node in the distributed system leaves the first shared resource in the flawed state before the node crashes.

Optionally, in any of the preceding embodiments, the vulnerable operation occurs when the node in the distributed system recovers as a recovery node after maintaining the first shared resource in the flawed state.

Optionally, in any of the preceding embodiments, the vulnerable operation comprises executing a write command on the first shared resource followed by a read command performed on the first shared resource.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A distributed database system involves multiple nodes that work together to perform one or more tasks to collectively execute a program on behalf of a requesting client. Many of the nodes in the distributed database system share resources with one another, and a state of the resources may need to be corrected before other nodes in the distributed database system can access the shared resources. The term "shared resources" may refer one or more memory units at a node that stores data, which may be accessed by many other nodes within the distributed database system. When a node fails to restore or update a shared resource due to, for example, a node failure, the entire distributed database system may crash or fail.

Embodiments of the present disclosure are directed to methods, systems, and apparatuses of accurately and efficiently detecting a time of fault (TOF) failure (TOF bug) that occurs when a state of a shared resource is not corrected at a certain time. For example, a TOF bug occurs when a node crashes after designating a shared resource as being in a flawed state and before restoring the shared resource to an accessible (non-flawed) state. In an embodiment, a TOF bug may be detected by monitoring a program executed by the distributed database system to determine when vulnerable operations occur. A vulnerable operation is a set of one or more actions performed by one or more nodes on a shared resource, where the set of actions include designating the shared resource as being in a flawed state. In an embodiment, a vulnerable operation that is not protected by a fault-tolerance mechanism may be deemed to include a TOF bug.

Figure 1:
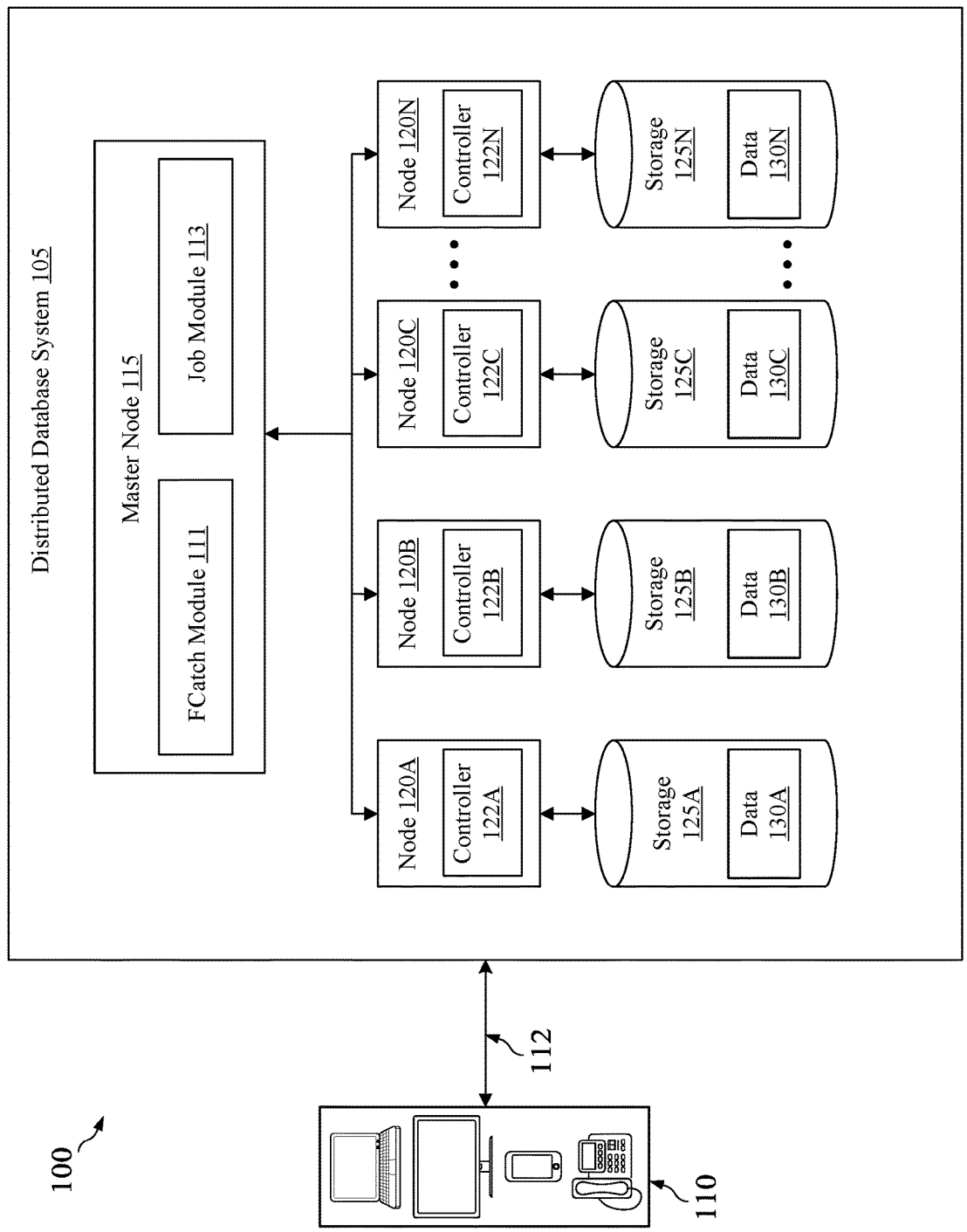
FIG. 1 shows network including a distributed database system that is accessible by one or more client terminals according to an embodiment of the disclosure.

FIG. 1 shows network 100 including a distributed database system 105 that is accessible by one or more client terminals 110 according to an embodiment of the disclosure. The client terminal 110 is coupled to the distributed database system 105 over a link 112. By way of illustration, a distributed database can be an object-oriented database, a relational database, a document-oriented database, or a graph-based database. Other database types are possible. The distributed database system 105 may be executing in a single physical location on one or more computers or, for example, executing as a cloud service in multiple data centers that located in different physical locations. As examples, the link 112 may be wired or wireless communications channels in a local area network (LAN), wide area network (WAN), or other type of network. From the client terminal 110, a user or software application is able to issue database queries to extract and process data stored in the distributed database system 105.

The distributed database system 105 may include a master node 115 and a plurality of nodes 120A-N. The master node 115 is configured to control and manage nodes 120A-N. The master node 115 may include a fault catch (FCatch) module 111 and a job module 113. In an embodiment, the master node 115 is configured to receive requests from applications executed by client terminals 110. The request may be for a program that may consist of one or more jobs performed by the distributed database system 105 using the data 130 stored at nodes 120A-N. A job refers to one or more computations that may be performed on the data 130 stored on the nodes 120A-N in the distributed database system 105. The job module 113 of the master node 115 may be configured to break down a job into many smaller tasks and distributes the tasks across the nodes 120A-N in the distributed database system 105. The job module 113 may also be configured to monitor the tasks to make sure that all the tasks complete successfully. For example, when the job module 113 schedules a task, the master node 115 may be configured to schedule the task on the node 120 that also holds the chunk of data to be processed. Although FIG. 1 only shows that the master node 115 includes a FCatch module 111 and a job module 113, it should be appreciated that the master node 115 may include other modules configured to perform the function of the master node 115.

In one embodiment, each of the nodes 120A-N includes a respective controller 122A-N. The controllers 122A-N are configured to communicate with each other and master node 115. Each controller 122A-N is responsible for managing access of a respective portion of the database. Each controller 122A-N may be implemented in software, hardware, and/or firmware and configured to manage access (including reads and writes) of data stored in each of the respective storages 125A-N of the distributed database system 105. In some embodiments, the controllers 122A-N are configured to manage the creation and modification of the data 130A-N in the distributed database system 105. To enable parallel processing, each table in the distributed database system 105 is divided into a plurality of partitions of data 130A-N and distributed among each of the controllers 122A-N. As shown in FIG. 1, the data 130A-N is stored in respective storages 125A-N. The distributed database system 105 may be configured to perform distributed computing, which is a form of parallel computing in which the processing nodes 120A-N are physically distributed and interconnected.

The distributed database system 105 may be configured to execute a program using the master node 115 and the nodes 120A-N. A program may involve one or more jobs, which can be divided into smaller tasks, where each task is executed by a respective one of the nodes 120A-N. The nodes 120A-N may need to cooperate with each other to maintain a shared state at certain resources within the data 130A-N to work on a given job or program. Such cooperation is challenging given the frequency of faults, or component failures within the distributed database system 105. The timing conditions and systems states under which a fault might occur are difficult to anticipate.

In an embodiment, the master node 115 comprises a FCatch module 111 configured to identify various failures or bugs that may occur when executing a program at the distributed database system 105. In an embodiment, the FCatch module 111 is configured to identify when a TOF bug may occur during the execution of a program at the distributed database system 105. As will be further described below with reference to FIG. 4, a TOF bug refers to a failure that occurs at a specific time during the execution of a vulnerable operation that affects the state of a shared resource that may be accessed by nodes 120A-N. The shared resource may be part of data 130A-N at one of nodes 120A-N.

In some embodiments, a TOF bug occurs when a node 120A crashes after executing a write command that changes the data stored at a shared resource. The data stored at the shared resource should have been corrected using another write command performed by node 120A. However, since node 120A crashes before correcting the shared resource, another node 120A-N may not be able to read the accurate data from the shared resource.

A shared resource may be in an accessible state when the data stored at the shared resource is data that other nodes 120A-N expect to read when the other nodes 120A-N perform a read operation on the shared resource. For example, when the shared resource is in an accessible state, other nodes 120A-N may perform a read operation on the shared resource and receive data that may be accurately used to perform jobs or tasks within the distributed database system 100. In contrast, a shared resource may be in a flawed state when the data stored at the shared resource is not data that other nodes 120A-N should expect to read when the other nodes 120A-N perform a read operation on the shared resource. For example, when the shared resource is in a flawed state, other nodes 120A-N may perform a read operation on the shared resource and receive flawed data that may not be accurately used to perform jobs or tasks within the distributed database system 100.

A TOF bug can be difficult to detect because of the unpredictable timing at which the TOF bug occurs. For example, network administrators may not be able to easily determine the precise timings that the TOF bug occurs because such a determination would typically require a trace of every single task performed by every single node 120A-N, which would consume too many database resources. However, this is problematic because TOF bugs can exist in deployed distributed systems and cause system wide failures instead of merely node failures due to the nature of the shared resource.

In some embodiments, the FCatch module 111 is configured to detect TOF bugs by first monitoring correct (error free) runs of the program and faulty runs of the program to detect when vulnerable operations occur during the program execution. For example, a vulnerable operation is a sequence of actions performed on a shared resource, where the sequence of actions excludes performing a state correction on the shared resource when the shared resource is in a flawed state. When the shared resource is in a flawed state, a state correction is performed on a shared resource to restore or update the state of the shared resource to an accessible state. An accessible state is a state in which the shared resource stores the proper data that may be shared among nodes 120A-N of the distributed database system 105. A subsequent read command can be performed at a time when the shared resource is in an accessible state. When a vulnerable operation does not perform state correction on the shared resource, then the subsequent read command cannot properly execute and the system will be held in a waiting (or hung) state where the shared resource is waiting to be updated before continuing with proper execution.

Once a vulnerable operation is detected, the FCatch module 111 is configured to determine whether a fault-tolerance mechanism has been implemented for that vulnerable operation. In an embodiment, a fault-tolerance mechanism is a mechanism by which the distributed database system 105 is prevented from crashing when a certain shared resource is persistently in a waiting state. For example, a fault-tolerance mechanism may be a timeout, which executes to make sure that a node 120A-N will not be held in a waiting state for beyond a predetermined period of time before the shared resource is reset to a default state. Another example of a fault-tolerance mechanism may occur when a node 120A-N is configured to reset the shared resource upon occurrence of an event. For example, when a node 120A crashes after performing a write command on a shared resource and before the shared resource is updated to a state that is accessible by other nodes, the shared resource may be reset or updated to the value that is accessible by other nodes upon occurrence of the crash. For example, the fault-tolerance mechanism may involve changing the data stored at the shared resource to a value that was stored at the shared resource before the crash occurred. As another example, the fault-tolerance mechanism may involve changing the data stored at the shared resource to any value that may be read by other nodes 120A-N such that the other nodes 120A-N may accurately perform tasks and jobs at the distributed database system 100. Another example of a fault-tolerance mechanism occurs when node 120A restarts after a crash and resets or updates a value in a shared resource upon restarting the node 120A. For example, a restarted node 120A may include a memory having the shared resource, where the shared resource includes a value that was stored at the shared resource before the crash occurred or the shared resource includes any value that may be read by other nodes 120A-N such that the other nodes 120A-N may accurately perform tasks and jobs at the distributed database system 100. Another example of a fault-tolerance mechanism occurs when node 120A is configured to determine whether a shared resource is in an accessible state before accessing the shared resource. That is, the node 120A may be configured to avoid accessing shared resources that are in flawed states.

In an embodiment, FCatch module 111 is configured to determine that the vulnerable operation results in a TOF bug when the vulnerable operation is not remedied by a fault-tolerance mechanism. By using fault-tolerance mechanisms, the TOF bugs can be prevented from occurring during the execution of a program. The developer of the network 100 may also be incentivized to implement a fault-tolerance mechanism for the vulnerable operation upon detection of the vulnerable operation.

Although FIG. 1 shows that the FCatch module 111 is executed at the master node 115, it should be appreciated that the FCatch module 111 can be executed external to the distributed database system 105. For example, a simulation of the distributed database system 105 may be used to detect TOF bugs. The FCatch module 111 is configured to communicate with the master node 115 to generate the simulation of the distributed database system 105. In some embodiments, the FCatch module 111 may be part of each of the nodes 120A-N such that each of the nodes 120A-N is configured to detect TOF bugs autonomously without the use of the master node 115.

Figure 2:
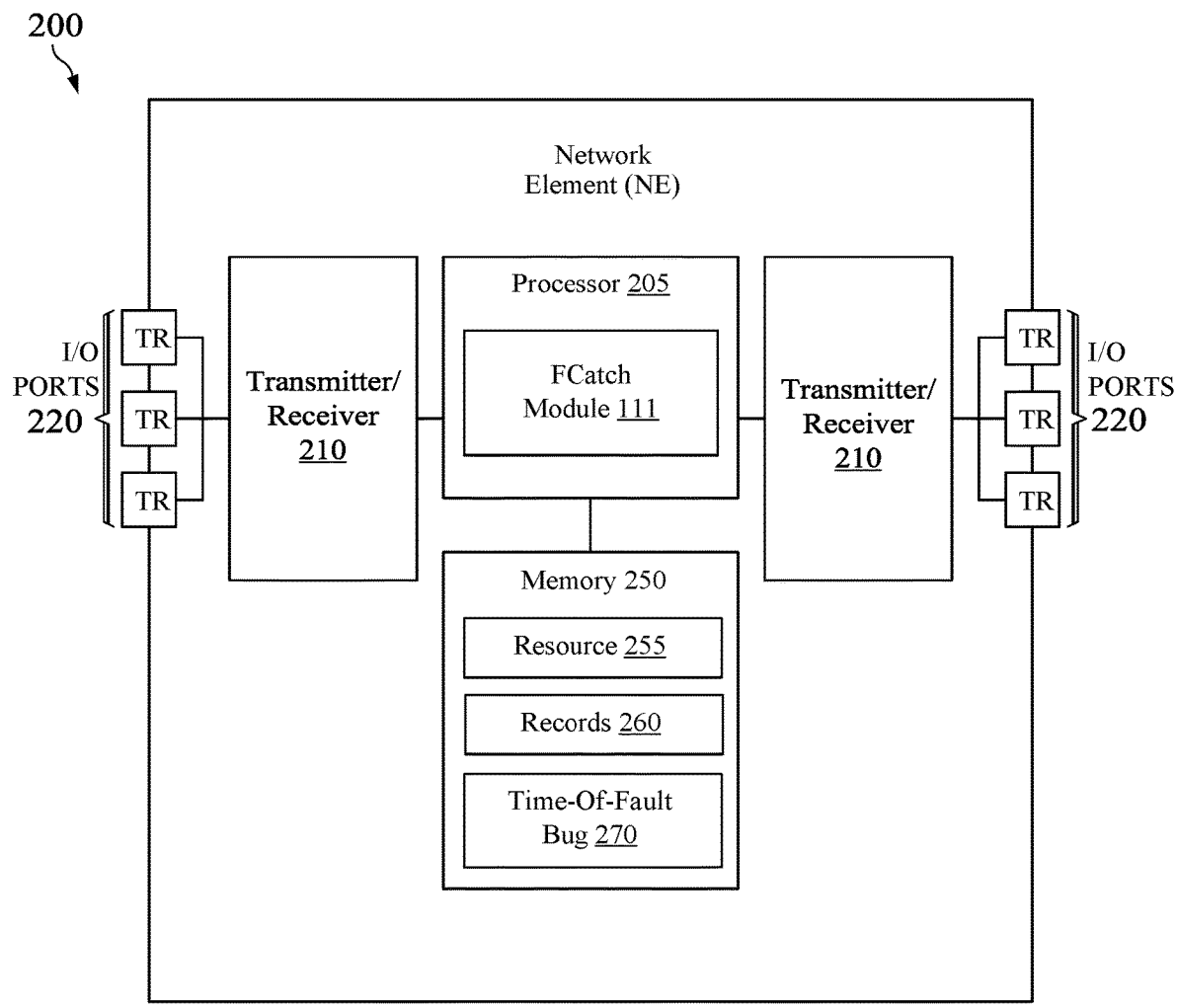
FIG. 2 is a schematic diagram of an embodiment of an NE.

FIG. 2 is a schematic diagram of an embodiment of a Network element (NE) 200, such as distributed database system 105 or nodes 120A-N in a network such as the network 100. NE 200 may be configured to implement and/or support the storing and updating of copies of shadow table mechanisms and schemes described herein. NE 200 may be implemented in a single node or the functionality of NE 200 may be implemented in a plurality of nodes. One skilled in the art will recognize that the term NE encompasses a broad range of devices of which NE 200 is merely an example. For example, a NE can be a general purpose computer. NE 200 is included for purposes of clarity of discussion, but is in no way meant to limit the application of the present disclosure to a particular NE embodiment or class of NE embodiments.

At least some of the features/methods described in the disclosure are implemented in a network apparatus or component such as a NE 200. For instance, the features/methods in the disclosure may be implemented using hardware, firmware, and/or software installed to execute on hardware. By way of illustration, the NE 200 is can transports packets through a network and thereby function as a switch, router, bridge, server, a client, etc. As shown in FIG. 2, the NE 200 comprises transceivers (Tx/Rx) 210, which may be transmitters, receivers, or combinations thereof. The Tx/Rx 210 is coupled to a plurality of ports 220 for transmitting and/or receiving packets from other nodes.

A processor 205 is coupled to each Tx/Rx 210 to process the packets and/or determine which nodes to send the packets to. The processor 205 may comprise one or more multi-core processors and/or memory devices 250, which may function as data stores, buffers, etc. The processor 205 may be implemented as a general processor or by one or more application specific integrated circuits (ASICs) and/or digital signal processors (DSPs).

In one embodiment, the processor 205 comprise internal logic circuits to implement the FCatch module 111, and may comprise internal logic circuits to implement the functional steps in methods 500, 700, and 800, as discussed more fully below, and/or any other flowcharts, schemes, and methods discussed herein. As such, the inclusion of the FCatch module 111 and associated methods and systems provide improvements to the functionality of the NE 200. In an alternative embodiment, the FCatch module 111 may be implemented as instructions stored in the memory device 250, which may be executed by the processor 205 to perform the operations of the FCatch module 111. Furthermore, the FCatch module 111 can optionally be omitted from the NE 200.

The memory device 250 may comprise a cache for temporarily storing content, e.g., a random-access memory (RAM). Additionally, the memory device 250 may comprise a long-term storage for storing content relatively longer, for example, a read-only memory (ROM). For instance, the cache and the long-term storage may include dynamic RAMs (DRAMs), solid-state drives (SSDs), hard disks, or combinations thereof. The memory device 250 may be configured to store the shared resources 255, which may be part of the data 130 stored at one of nodes 120A-N. The memory device 250 can store records 260, which are records storing information of the state of the shared resources 255 during execution of a program. The memory device 250 may also be configured to store the TOF bugs 270 after detecting that a vulnerable operation is not protected by a fault-tolerance mechanism.

It is understood that by programming and/or loading executable instructions onto the NE 200, at least one of the processor 205 and/or memory device 250 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g., a computer program product stored in a non-transitory medium/memory) may be viewed as a particular machine or apparatus.

Figure 3A:
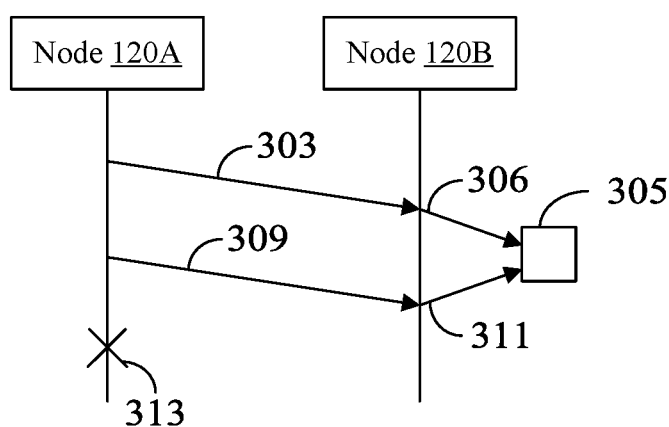
FIGS. 3A and 3B are examples of message sequence diagrams that illustrate the effect of timing when determining whether a TOF bug occurs in a database system based on a crash that affects at least two different nodes.
Figure 3B:
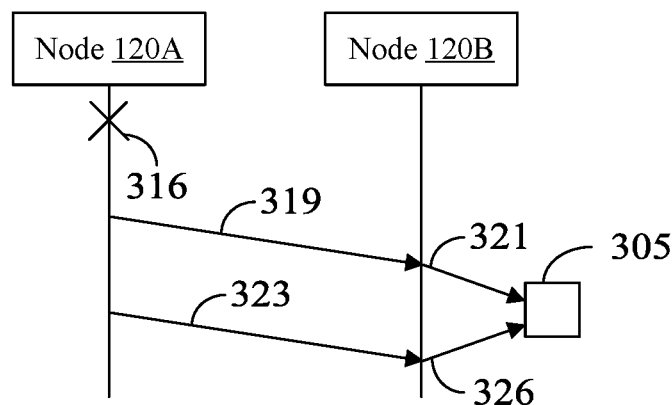

FIGS. 3A and 3B are examples of message sequence diagrams 300, 314 that illustrate the effect of timing when determining whether a TOF bug occurs in a distributed database system 105 based on a crash that affects at least two different nodes 120. The shared resource 305 may be part of the data 130A located at node 120A, the data 130B located at node 120B, or may be part of the data 130C-N located at any of the other nodes 120C-N. The shared resource 305 may be data that is stored at the database system 105 that is shared across all the nodes 120A-N in the database system 105. In this way, the shared resource 305 is in a flawed state when the shared resource 305 is in a state that is waiting to be corrected (restored or updated) to an accessible state. However, when the shared resource 305 stores data that may be accessible by other nodes 120A-N such that the other nodes 120A-N may use the data to accurately perform jobs and tasks, the shared resource 305 is in an accessible state.

FIG. 3A is a message sequence diagram 300 illustrating that a TOF bug does not occur when a state correction is performed on a shared resource 305 before a node 120A crashes. The message sequence diagram 300 may be performed by two different nodes 120A and B and perform different commands (such as a read command or write command) on the shared resource 305. At step 303, node 120A transmits a first message to node 120B. The first message may be a first command to write a certain value to the shared resource 305, thereby setting the shared resource 305 to a flawed state. At step 306, node 120B may set the shared resource 305 to the flawed state. At this point, the shared resource 305 contains a flawed state that is not accessible by other nodes 120C-N until node 120A corrects the state of the shared resource 305 by updating or restoring the state of the shared resource 305.

At step 309, node 120A sends a second message to node 120B. The second message may be a write command that instructs node 120B to correct the state in the shared resource 305 to a state that is accessible by other nodes 120C-N. At step 311, node 120B performs the write command included in the second message on the shared resource 305 to correct the value in the shared resource 305 such that the shared resource 305 is in an accessible state. For example, correcting the value in the shared resource 305 may involve changing the data stored at the shared resource to a value that was stored at the shared resource 305 before the crash occurred. As another example, correcting the value in the shared resource 305 may involve changing the data stored at the shared resource 305 to any value that may be read by other nodes 120A-N such that the other nodes 120A-N may accurately perform tasks and jobs at the distributed database system 100.

Subsequently, at step 313, node 120A may crash, or a fault may occur at node 120A. This results in node 120A being deemed a faulty node that may no longer interact with other nodes in the distributed database system 105. However, a TOF bug does not occur here because node 120A already corrected the value in the shared resource 305 before crashing. In this way, other nodes 120C-N may access the shared resource 305 in an accessible state, not a flawed state, and thus, a system wide crash may not occur simply because node 120A crashed.

FIG. 3B is another message sequence diagram 314 illustrating that a TOF bug does not occur when a node 120 crashes before a shared resource 305 is changed and corrected. At step 316, node 120A crashes to become a faulty node. In this case, all shared resources 305 are in accessible states when node 120A crashes. In some cases, node 120A may be restored after the crash occurs so that node 120A may subsequently continue to send messages.

Suppose node 120A is restored by the distributed database system 105 after the crash, then node 120A may send a first message to node 120B at step 319. The first message in FIG. 3B may be similar to the first message sent in FIG. 3A. The first message may be a first command to write a certain value to the shared resource 305, thereby setting the shared resource 305 to a flawed state. At step 321, node 120B may set the shared resource 305 to the flawed state. At this point, the shared resource 305 contains a flawed state that is not accessible by other nodes 120C-N until node 120A corrects the state of the shared resource 305.

At step 323, node 120A sends a second message to node 120B. The second message may be a write command that instructs node 120B to correct the value in the shared resource 305 to a state that is accessible by other nodes 120C-N. At step 326, node 120B performs the write command included in the second message on the shared resource 305 to restore or update the value in the shared resource 305 such that the shared resource 305 is in an accessible state.

In the situation shown in FIG. 3B, a TOF bug does not occur because the shared resource 305 is not in a flawed state before the crash occurs at node 120A. Instead, node 120A is simply restored to be a new node 120A with the shared resource 305 already in an accessible state. In this way, other nodes 120C-N may access the shared resource 305 in an accessible state, not a flawed state, and thus, a system wide crash may not occur simply because node 120A crashed.

Figure 4:
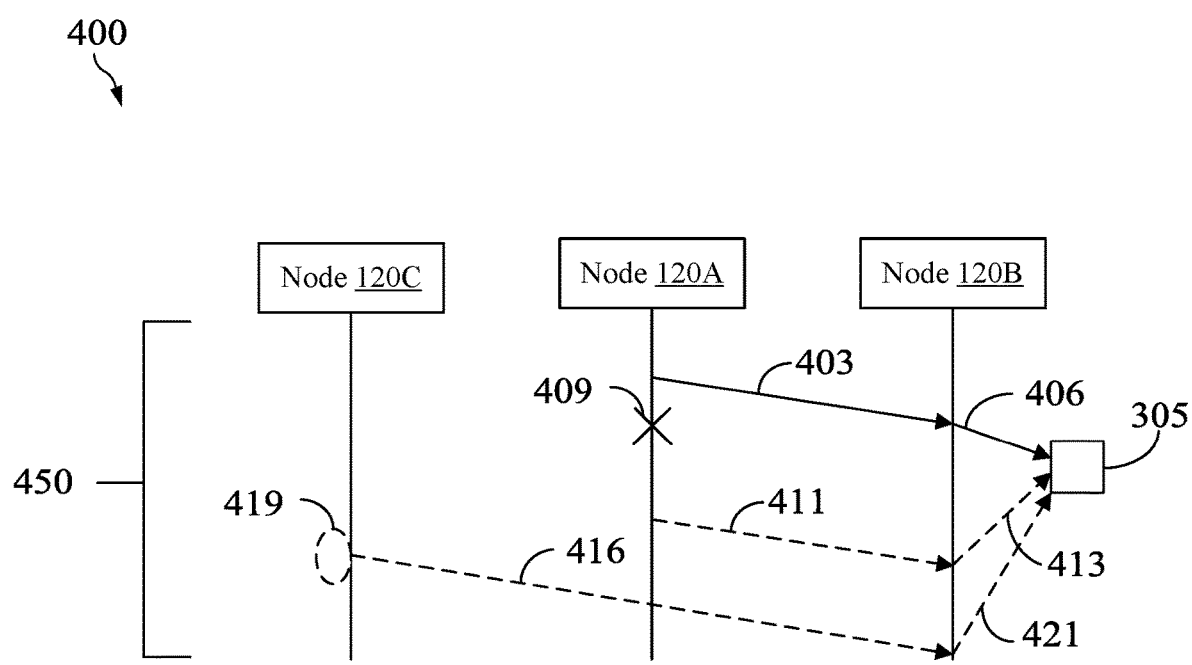
FIG. 4 is another example of a message sequence diagram that illustrates the effect of timing when determining whether a TOF bug occurs in a database system based on an occurrence of a node failure that affects at least two different nodes.

FIG. 4 is another example of a message sequence diagram 400 that illustrates the effect of timing when determining whether a TOF bug occurs in a distributed database system 105. In particular, FIG. 4 illustrates a node failure that affects at least two different nodes 120 (also referred to herein as a crash-regular TOF bug). In FIG. 4, a crash-regular TOF bug may occur when node 120A crashes at a specific time that affects other nodes, such as node 120C, in the distributed database system 105 (assuming that a fault-tolerance mechanism is not implemented to prevent the crash-regular TOF bug).

At step 403, node 120A transmits a first message to node 120B. Similar to message sequence diagrams 300 and 314 in FIGS. 3A and 3B, the first message may be a first command to write a certain value to the shared resource 305, setting the shared resource 305 to a flawed state. At step 406, node 120B may set the shared resource 305 to the flawed state. At this point, the shared resource 305 contains a flawed state that is not accessible by other nodes 120C-N until node 120A corrects the state of the shared resource 305.

At step 409, node 120A may crash and become a faulty node 120A. Here, node 120A crashes when the shared resource 305 is in a flawed state, where the shared resource 305 is waiting to be restored or updated to an accessible state. Therefore, any other node, such as node 120C, that attempts to access the shared resource 305 may fail because the shared resource 305 is in the flawed state when node 120A crashes.

The dotted arrows representing steps 411 and 413 may correspond to steps 309 and 311 in message sequence diagram 300 and steps 323 and 326 in message sequence diagram 314, which perform the step of correcting the shared resource 305 to an accessible state. However, the steps 411 and 413 of correcting the shared resource 305 are shown as dotted arrows in message sequence diagram 400 because the corrections do not actually get performed. This is because node 120A crashes at step 409 before the steps 411 and 413 of correcting the shared resource 305 are performed. Therefore, the shared resource 305 may be waiting in a hung state for node 120A and node 120B to perform steps 411 and 413, which may never be performed because node 120A crashes.

The nature of the shared resource 305 is such that the shared resource 305 may be accessible by all nodes 120A-N in the distributed database system 105 for all the nodes 120A-N in the database system 105 to function. For example, suppose node 120C needs to access the shared resource 305 to perform a task for a program as instructed by the master node 115. In this case, at step 416, node 120C may transmit a third message to node 120B. The third message may be a read command to read the value in the shared resource 305. At step 421, node 120B would typically have performed the read command to read the value in the shared resource 305 on behalf of node 120C. In this way, the shared resource 305 is shared among multiple nodes 120A-C in the system. However, node 120B may not perform the read command on the shared resource because the shared resource 305 is in a hung state waiting for a state correction to be performed. Therefore, as shown at step 419, node 120C may be configured to continuously send the third message to node 120B requesting a read command to be performed on the shared resource 305. However, as long as the shared resource 305 is in a flawed state, node 120C may not be able to read the value in the shared resource 305.

The sequence of commands and failures that occurs at steps 403, 406, and 409 refers to a vulnerable operation 450. In an embodiment, a vulnerable operation 450 may be a sequence of actions executed by one or more nodes 120A-N in the distributed database system 105 that is performed during an execution of a program, where the sequence of actions excludes performing a state correction on the shared resource 305. In an embodiment, the vulnerable operation 450 may refer to a sequence of commands that results in a shared resource 305 being set to a flawed state.

Distributed database system 105 such as cloud computing systems use different types of vulnerable operations that change the state of a shared resource 305 to a flawed state for a period of time. One example of a vulnerable operation that exists in a distributed database system 105 implementing a Hadoop-MapReduce function is a CanCommit operation, which temporarily changes the state of a shared resource 305 in the distributed database system 105. Other examples of vulnerable operations that may cause TOF bugs are described in the document entitled "FCatch: Automatically Detecting Time-of-fault Bugs in Cloud Systems," ASPLOS Submission #376, 2018, (also referred to herein as the "FCatch document"), which is hereby incorporated by reference in its entirety.

Assuming that a fault-tolerance mechanism has not been built for this vulnerable operation 450, the situation shown in message sequence diagram 400 illustrates a crash-regular TOF bug. The crash-regular TOF bug occurs as a result of a node 120 failing after setting a shared resource 305 to a flawed state such that the flawed state is accessible to other nodes 120 in the distributed database system 105. Therefore, the TOF bug illustrated in FIG. 4 shows a crash-regular regular TOF bug, which occurs between two different nodes 120A and 120B. A TOF bug may also occur on a single node, which will be further discussed below with reference to FIGS. 6 and 7.

Figure 5:
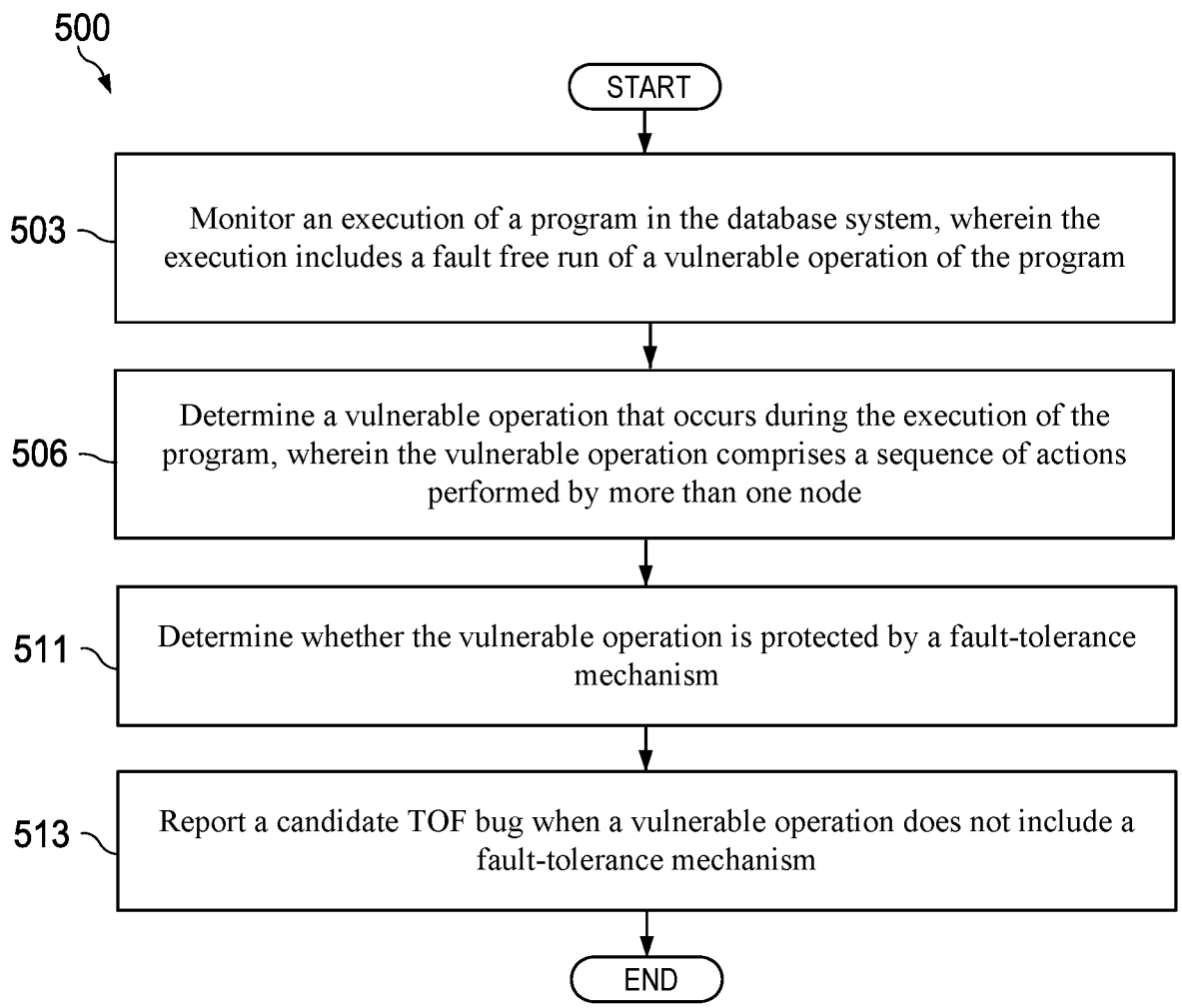
FIG. 5 is a flowchart of a method for detecting a crash-regular TOF bug that occurs between two different nodes in a database system.

FIG. 5 is a flowchart of method 500 for detecting a crash-regular TOF bug that occurs between two different nodes 120 in a distributed database system 105. Method 500 may be implemented by the FCatch module 111 executed by the processor 205, which may be located at the master node 115 or outside the distributed database system 105. Method 500 may be implemented when a test to detect TOF bugs is performed by an administrator of the distributed database system 105.

At step 503, an execution of a program is monitored in the distributed database system 105. For example, FCatch module 111 is executed by the processor 205 to monitor an execution of a program in the distributed database system 105. The program may include a vulnerable operation 450 in which a sequence of actions performed by two different nodes 120 results in a shared resource 305 being temporarily left in a flawed state. In an embodiment, the monitored execution of the program includes a fault free execution of the vulnerable operation 450 of the program in which a node 120 does not crash in between execution of the vulnerable operation 450.

In an embodiment, monitoring execution of the program may involve performing a trace of the execution of the program at the distributed database system 105 to generate a record 260 of the shared resources 305 during execution of the program. For example, the record 260 may include a value or state at each of the shared resources 305 and a corresponding time at which the state of the shared resources 305 changes during execution of the program. The record 260 may also indicate when various operations or commands are performed on the shared resource 305. For example, the record 260 may indicate a time at which a write command is performed on a shared resource 305 and a time at which a read command is performed on a shared resource 305. The record 260 may also include identifiers of the nodes 120 that perform the write command or the read command on the shared resource 305. In this way, the record 260 includes a detailed account of the various states, times, operations, actions, commands, and nodes 120 that interact with every shared resource 305 in a distributed database system 105. In an embodiment, the records 260 may be stored at the memory 250. The records 260 may also record fault-tolerance mechanisms that occur to prevent the TOF bug from crashing the distributed database system 105.

At step 506, a vulnerable operation 450 may be determined during the execution of the program, wherein the vulnerable operation comprises a sequence of actions performed by more than one node 120. In one embodiment, the vulnerable operation 450 may be a conflicting operation that results in a shared resource 305 being left in a flawed state for a period of time such that different nodes 120 have a blocking happens-before relationship with each other. A blocking happens-before relationship between two nodes 120 refers to when a node 120 is waiting for a command from another node 120 to correct a shared resource 305 to an accessible state.

For example, the FCatch module 111 determines one or more vulnerable operations 450 that may occur during the execution of the program. For example, the records 260 may be used to identify vulnerable operations 450 that are performed during the execution of the program being tested. For example, the records 260 may indicate which shared resources 305 are in flawed states for temporary periods of time and are accessed by other nodes 120. Method 500 may use these records 260 to identify the vulnerable operations 450 that may result in shared resources 305 being in a flawed state for a period of time. As step 503 involves the execution of a fault free run of the program, the vulnerable operations 450 that are identified may not actually result in a TOF bug.

At step 511, a determination may be made as to whether the vulnerable operation 450 is protected by a fault-tolerance mechanism. A fault-tolerance mechanism may be any mechanism that prevents the shared resource 305 from remaining in a flawed state permanently. For example, a timeout mechanism that automatically resets the value of the shared resource 305 after the shared resource 305 remains in the hung state for predetermined period of time is a fault-tolerance mechanism. As should be appreciated, any other fault-tolerance mechanism that restores or updates the shared resource 305 automatically to prevent the shared resource 305 from causing a system crash may be determined at step 511.

For example, FCatch module 111 determines whether a vulnerable operation 450 includes a fault-tolerance mechanism. The records 260 may be used to determine which identified vulnerable operations 450 include fault-tolerance mechanisms and which ones do not. At step 513, the vulnerable operations 450 that are determined to not include a fault-tolerance mechanism may be determined to be a candidate TOF bug. For example, FCatch module 111 determines that the vulnerable operations 450 that do not have built-in fault-tolerance mechanisms are candidate TOF bugs.

In some embodiments, upon determining candidate TOF bugs, the FCatch module 111 may determine which of the candidate TOF bugs are likely to be actual TOF bugs by inserting a fault or crash at a node 120 to trigger the candidate TOF bug. In this way, the candidate TOF bug may be triggered at a time after a node 120 sets a shared resource 305 to be in a flawed state and before the node 120 restores the shared resource 305 to be in an accessible state. The FCatch module 111 may monitor the distributed database system 105 subsequent to the triggered crash to see whether the crash causes a failure or not.

If the triggered crash causes a system wide failure, then the candidate TOF bug may be determined to be an actual TOF bug and reported as such to the administrator of the distributed database system 105. At this point, the administrator of the distributed database system 105 may update the distributed database system 105 to prevent the TOF bug by, for example, installing a fault-tolerance mechanism at the vulnerable operation 450 that caused the TOF bug. Alternatively, the vulnerable operation 450 may be avoided altogether to avoid the possibility of the TOF bug causing a system wide crash.

Further details regarding steps 503, 506, 511, and 513 are described in the FCatch document which has already been incorporated by reference in its entirety. The TOF bug described with reference to method 500 relates to a crash-regular TOF bug, which occurs between two different nodes 120. A TOF bug may also occur on a single node, which will be further discussed below with reference to FIGS. 6 and 7.

Figure 6:
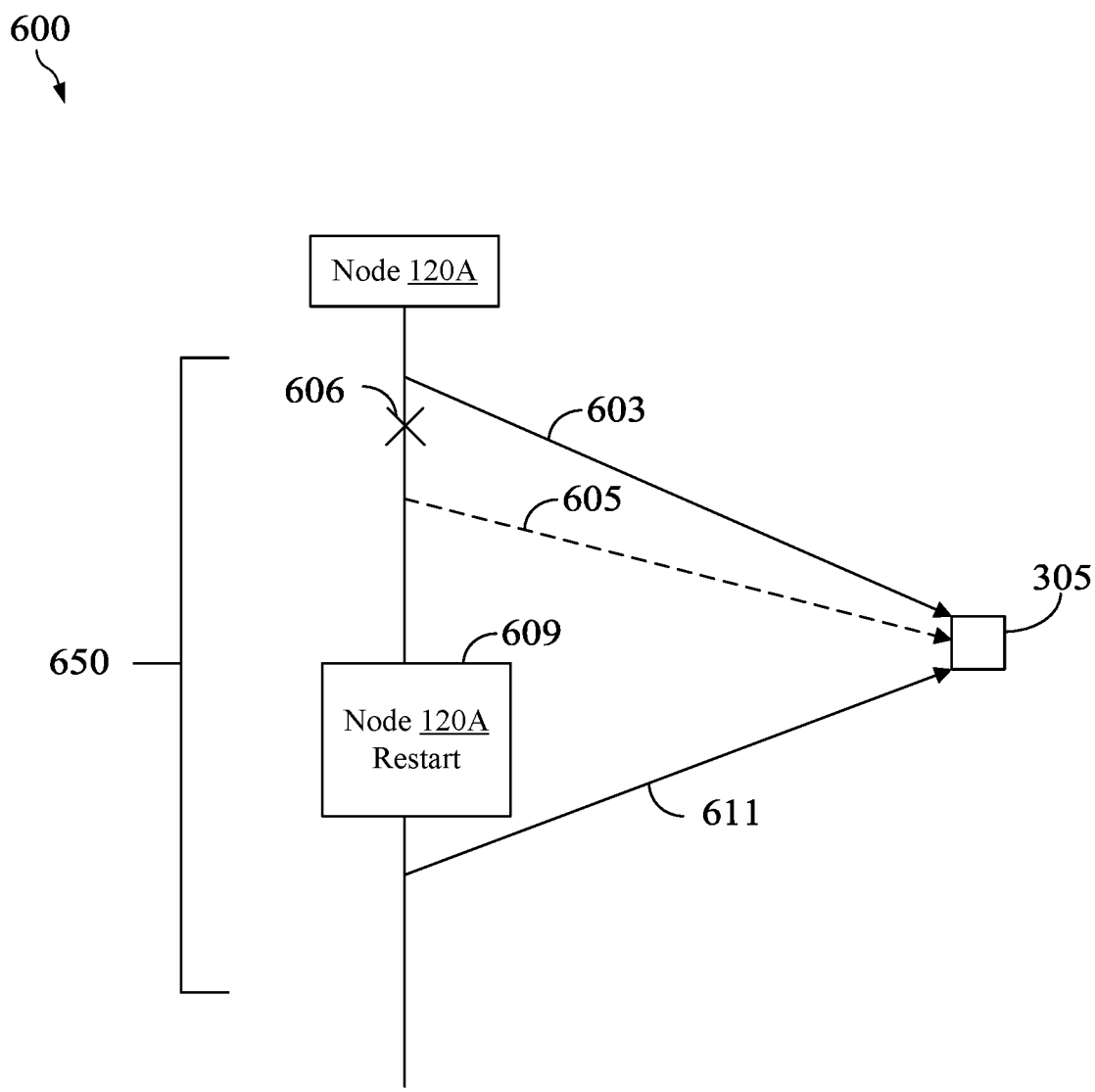
FIG. 6 is a message sequence diagram that illustrates the effect of timing when determining whether a TOF bug occurs in a database system based on an occurrence of a node failure and subsequent node recovery at a single node.

FIG. 6 is a message sequence diagram 600 that illustrates the effect of timing when determining whether a TOF bug occurs in a distributed database system 105. In particular, FIG. 6 illustrates a node failure and subsequent node recovery at a single node 120 (also referred to herein as a crash-recovery TOF bug). In FIG. 6, a TOF bug crash-recovery TOF bug occurs when node 120A crashes and restarts after setting a shared resource 305 to a flawed state (assuming that a fault-tolerance mechanism is not implemented to prevent the crash-recovery TOF bug).

At step 603, node 120A may set a shared resource 305 to a flawed state. For example, node 120A may execute a write command on the shared resource 305 that sets the shared resource 305 to flawed state where the shared resource 305 waits for a correction to be performed on the shared resource 305.

After setting the shared resource 305 to a flawed state, at step 606, node 120A may crash and become a faulty node 120A. Here again, node 120A crashes when the shared resource 305 is in a flawed state, where the shared resource 305 is waiting to be corrected to an accessible state. Therefore, any node that attempts to access the shared resource 305 may fail because the shared resource 305 is in the flawed state when node 120A crashes.

The dotted arrow representing step 605 represents the expected step where node 120A is supposed to correct the shared resource 305 from the flawed state to an accessible state. However, step 605 shown as the dotted arrow in message sequence diagram 600 is not actually performed since node 120A crashes before step 605 is performed. Therefore, the shared resource 305 may wait in a hung state for node 120A to perform step 605, which may never be performed since node 120A crashes.

In some embodiments, upon a node failure, the distributed database system 105 may be configured to restart the node that failed so that the node may continue to perform tasks as initiated by the master node 115. At step 609, node 120A is restarted after failing. At this point when node 120A is restarted, the shared resource 305 still contains a flawed state that is not accessible by nodes 120, including the restarted node 120A.

At step 611, the restarted node 120A may attempt to access the shared resource 305 by, for example, executing a read command of the shared resource 305. However, the value of the shared resource 305 may not be read because the shared resource 305 is in a hung state waiting for a state correction to be performed. Therefore, node 120A may continuously attempt to execute a read command on the shared resource 305 only to result in a continuous failure since the shared resource 305 is in a flawed state.

The sequence of commands and failures that occurs at steps 603, 606, and 609 refers to a vulnerable operation 650. Unlike vulnerable operation 450 that is performed by multiple nodes 120, the vulnerable operation 650 may be a sequence of actions executed by a single node 120A that fails and subsequently recovers during execution of a program. Similar to vulnerable operation 450, the vulnerable operation 650 also refers to a sequence of actions that results in a shared resource 305 being set to a flawed state, where the sequence of actions excludes performing a state correction on a shared resource 305.

Assuming that a fault-tolerance mechanism has not been built for this vulnerable operation 650, the situation shown in message sequence diagram 600 illustrates a crash-recovery TOF bug. The crash-recovery TOF bug occurs as a result of a node 120 failing after setting a shared resource 305 to a flawed state.

Figure 7:
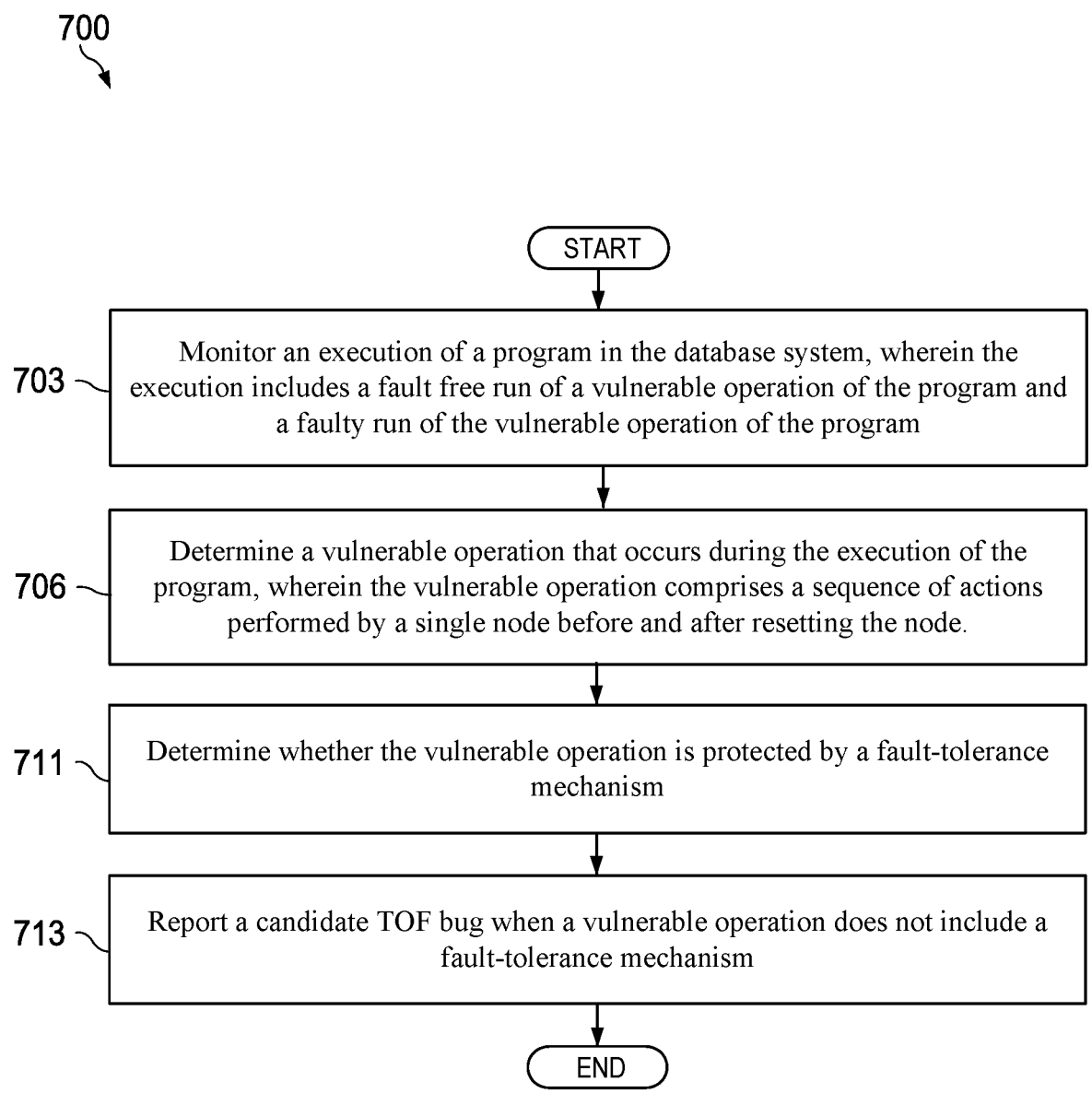
FIG. 7 is a flowchart of a method for detecting a crash-recovery TOF bug that occurs at a node that has been restarted after crashing.

FIG. 7 is a flowchart of method 700 for detecting a crash-recovery TOF bug that occurs at node 120 that has been restarted after crashing. Method 700 may be implemented by the FCatch module 111 executed by the processor 205, which may be located at the master node 115 or outside the database system 105. Method 700 may be implemented when a test to detect TOF bugs is performed by an administrator of the database system 105.

At step 703, an execution of a program is monitored in the distributed database system 105. For example, FCatch module 111 is executed by the processor 205 to monitor an execution of a program in the distributed database system 105. The program may include a vulnerable operation 650 in which a sequence of actions performed by a single node 120 that crashes after setting a shared resource 305 to a flawed state and then restarts.

Unlike method 500 that is for crash-regular TOF bugs, method 700 may be configured to monitor execution of both fault free runs and faulty runs of a vulnerable operation 650 of the program. This is because method 700 that is for crash-recovery TOF bugs involves the testing of a node 120 that is restarted after a failure, and therefore, a faulty run of the vulnerable operation may also be traced to determine how the program runs when the node 120 is restarted.

Similar to step 503 of method 500, the monitoring of the execution of the program may involve tracing the execution of the program, including both the faulty trace and the fault free trace, to generate the record 260 of the shared resources 305 during execution of the program. The record 260 similarly includes a detailed account of the various states, times, operations, actions, commands, and nodes 120 that interact with every shared resource 305 in the distributed database system 105. The records 260 may also include the fault-tolerance mechanisms that occur to prevent the TOF bug from crashing the distributed database system 105.

At step 706, a vulnerable operation 650 may be determined during the execution of the program, wherein the vulnerable operation 650 comprises a sequence of actions performed by a single node before and after resetting the node 120. Suppose a node 120 performs a write command on a shared resource 305 that places the shared resource 305 in a flawed state and then node 120 crashes, then a vulnerable operation 650 may occur when the node 120 restarts and attempts to perform a read command on the shared resource 305. Therefore, the vulnerable operation 650 occurs when the shared resource 305 fails to be restored or updated using another write command before the node 120 crashes.

For example, FCatch module 111 determines one or more vulnerable operations 650 that may occur during the execution of the program. For example, the records 260 may be used to identify vulnerable operations 650 that are performed during the execution of the program being tested. For example, the records 260 may indicate which shared resources 305 are in flawed states after a node 120 has been restarted.

At step 711, a determination may be made as to whether the vulnerable operation 450 is protected by a fault-tolerance mechanism. A fault-tolerance mechanism may be any mechanism that prevents the shared resource 305 from remaining in a flawed state permanently. In the case of the crash-recovery TOF bug detection, there may be two types of fault-tolerance mechanisms. A first of the fault-tolerance mechanisms may occur when the restarted node determines which shared resources 305 to access and how. For example, after a node 120 has already restarted and before the node 120 performs a read command on a shared resource 305, the node 120 may determine whether or not to perform the read command on the shared resource 305. For example, the node 120 may determine that the shared resource 305 is in a flawed state, and thus, may determine not to perform the read command on the shared resource 305. In contrast, the node 120 may determine that the shared resource 305 is in an accessible state, and thus, may determine to perform the read command on the shared resource 305. This control analysis prevents the crash-recovery TOF bug from occurring in the vulnerable operation 650.

Another fault-tolerance mechanism may occur when the restarted node 120 automatically restores the shared resource 305 upon restarting the node 120. For example, after a node 120 has already restarted and before the node 120 performs a read command on a shared resource 305, the node 120 may be configured to automatically restore all the shared resources 305 to an accessible state. In one embodiment, only the shared resources 305 in the flawed state may be restored automatically upon resetting the node 120. In another embodiment, all shared resources 305, both accessible and flawed, are restored automatically upon resetting the node 120. While only these two fault-tolerance mechanisms are discussed, it should be appreciated that any other fault-tolerance mechanism that restores or updates the shared resource 305 automatically to prevent the shared resource 305 from causing a system crash may be determined at step 711.

For example, FCatch module 111 determines whether a vulnerable operation 650 includes a fault-tolerance mechanism. The records 260 may be used to determine which identified vulnerable operations 650 include fault-tolerance mechanisms and which ones do not. At step 713, the vulnerable operations 650 that are determined to not include a fault-tolerance mechanism may be determined to be a candidate TOF bug. For example, FCatch module 111 determines that the vulnerable operations 650 that do not have built-in fault-tolerance mechanisms are candidate TOF bugs.

In some embodiments, upon determining candidate TOF bugs, the FCatch module 111 may determine which of the candidate TOF bugs are likely to be actual TOF bugs by inserting a fault or crash at a node 120 to trigger the candidate TOF bug and then immediately restarting the node 120 that crashed. In this way, the candidate TOF bug may be triggered at a time after a node 120 sets a shared resource 305 to be in a faulty state, before the node 120 restores the shared resource 305 to be in an accessible state, and before the node 120 crashes and restarts. The FCatch module 111 may monitor the distributed database system 105 subsequent to the triggered crash to see whether the crash causes a system wide failure or not. If the triggered crash causes a system wide failure, then the candidate TOF bug may be determined to be an actual TOF bug and reported as such to the administrator of the distributed database system 105.

Figure 8:
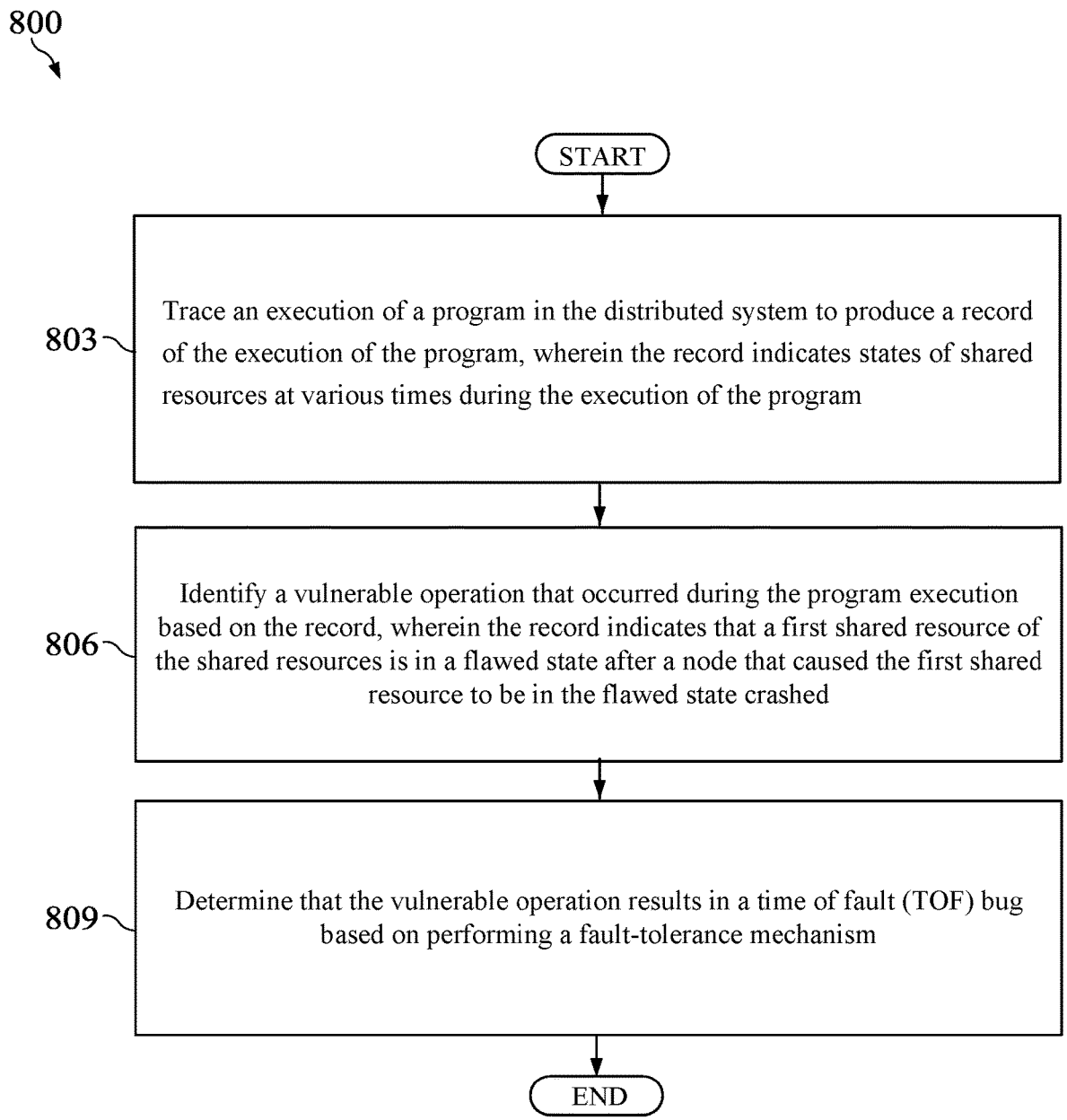
FIG. 8 is a flowchart of a method for detecting a TOF bug in a database system.

FIG. 8 is a flowchart of method 800 for detecting a TOF bug in a distributed database system 105. Method 800 may be implemented by the FCatch module 111 executed by the processor 205, which may be located at the master node 115 or outside the distributed database system 105. Method 800 may be implemented when a test to detect TOF bugs is performed by an administrator of the distributed database system 105.

At step 803, an execution of a program in a distributed database system 105 may be traced to produce a record of the execution of the program. For example, FCatch module 111 traces the execution of a program in the distributed database system 105 in response to the master node 115 dividing the program into one or more jobs and tasks that are executable by various nodes 120 of the distributed database system 105. The tracing or monitoring of the execution of the program may be similar to that described with reference to step 503 related to crash-regular TOF bugs or step 706 related to crash-recovery TOF bugs. For example, when method 800 is implemented to detect a crash-regular TOF bug, the tracing of the execution of the program may involve monitoring or tracing a fault free execution of a vulnerable operation 450 of the program. In contrast, when method 800 is implemented to detect a crash-recovery TOF bug, the tracing of the execution of the program may involve monitoring or tracing both a fault free and a faulty execution of the vulnerable operation 650 of the program. In some embodiments, the record indicates states of shared resources 305 at various times during execution of the program.

At step 806, a vulnerable operation is determined during execution of the program based on the record. For example, FCatch module 111 identifies the vulnerable operation during execution of the program. In some embodiments, the record indicates that a first shared resource 305 of the shared resources is in a flawed state after a node 120 that caused the first shared resource 305 to be in the flawed state crashed.

In an embodiment, the vulnerable operation comprises a sequence of actions performed on a shared resource 305. The determination of the vulnerable operation may be similar to that described with reference to step 506 related to crash-regular TOF bugs or step 706 related to crash-recovery TOF bugs. For example, when method 800 is implemented to detect a crash-regular TOF bug, the determination of a vulnerable operation 450 may involve identifying a sequence of actions performed by more than one node, where a shared resource 305 is left in a flawed state before a node 120 crashes. When method 800 is implemented to detect a crash-recovery TOF bug, the determination of a vulnerable operation 650 may involve identifying a sequence of actions performed by a single node before and after restarting the crashed node 120, where a shared resource is left in a flawed state before the node 120 crashes.

At step 809, a determination is made that the vulnerable operation results in a TOF bug based on performing a fault-tolerance mechanism. For example, FCatch module 111 determines whether the vulnerable operation is protected by a fault-tolerance mechanism. The determination of whether the vulnerable operation is protected by a fault-tolerance mechanism may be similar to that described with reference to step 511 related to crash-regular TOF bugs or step 711 related to crash-recovery TOF bugs. For example, when method 800 is implemented to detect a crash-regular TOF bug, the determination of whether the vulnerable operation 450 is protected by a fault-tolerance mechanism may involve determining whether a timeout mechanism is built into the vulnerable operation 450. The timeout mechanism may ensure that the vulnerable operation 450 will not result in a system crash of the distributed database system 105. When method 800 is implemented to detect a crash-recovery TOF bug, the determination of whether the vulnerable operation 650 is protected by a fault-tolerance mechanism may involve determining whether the restarted node 120 determines whether a shared resource 305 is in an accessible state before performing a read operation. The determination of whether the vulnerable operation 650 is protected by a fault-tolerance mechanism may also involve determine whether the restarted node 120 is configured to automatically reset the state of a shared resource 305 upon restarting the node 120.

In an embodiment, the disclosure includes a means for tracing an execution of a program in the distributed system to produce a record of the execution of the program, wherein the record indicates states of shared resources at various times during the execution of the program, a means for identifying a vulnerable operation that occurred during the program execution based on the record, wherein the record indicates that a first shared resource of the shared resources is in a flawed state after a node that caused the first shared resource to be in the flawed state crashed, and a means for determining that the vulnerable operation results in a time of fault (TOF) bug based on performing a fault-tolerance mechanism.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network element (NE) in a distributed system, the method comprising:
   tracing, by a processor of the NE, an execution of a program in the distributed system to produce a record of the execution of the program, the record indicating a state of a shared resource at various times during the execution of the program, the state of the shared resource indicating whether data stored at the shared resource is in an accessible state or in a flawed state based on whether the data is accessible for performing a task by other NEs in the distributed system;
   identifying, by the processor of the NE, a vulnerable operation that occurred during the program execution based on the record indicating that the state of the shared resource changed from the accessible state to the flawed state, the vulnerable operation comprising a sequence of actions excluding a state correction action that restores a state of the shared resource to the accessible state, the vulnerable operation occurring in response to detecting that a shared resource of a plurality of shared resources is in a flawed state and in response to detecting a crash in a node in the distributed system, the crash causing the shared resource to be in the flawed state;
   determining, by the processor of the NE, that the vulnerable operation results in a time of fault (TOF) bug based on performing a fault-tolerance mechanism;
   causing, by the processor of the NE, the fault-tolerance mechanism to be implemented for the program.

2. The method of claim 1, wherein the record indicates that the vulnerable operation is protected by the fault-tolerance mechanism.

3. The method of claim 1, wherein the vulnerable operation occurs when the node in the distributed system leaves the shared resource in the flawed state before the node crashes.

4. The method of claim 1, wherein the vulnerable operation occurs when the node in the distributed system recovers as a recovery node after maintaining the shared resource in the flawed state.

5. The method of claim 1, wherein the fault-tolerance mechanism is a timeout mechanism.

6. The method of claim 1, wherein the record indicates that the vulnerable operation is not protected by the fault-tolerance mechanism.

7. An apparatus implemented as a network element (NE), comprising:
   a memory storage comprising instructions; and
   one or more processors in communication with the memory storage, wherein the one or more processors execute the instructions to:

trace an execution of a program in the distributed system to produce a record of the execution of the program, the record indicating a state of a shared resource at various times during the execution of the program, the state of the shared resource indicating whether data stored at the shared resource is in an accessible state or in a flawed state based on whether the data is accessible for performing a task by other NEs in the distributed system;

identify a vulnerable operation that occurred during the program execution based on the record indicating that the state of the shared resource changed from the accessible state to the flawed state, the vulnerable operation comprising a sequence of actions excluding a state correction action that restores a state of the shared resource to the accessible state, the vulnerable operation occurring in response to detecting that a shared resource of a plurality of shared resources is in a flawed state and in response to detecting a crash in a node in the distributed system, the crash causing the shared resource to be in the flawed state; and determine that the vulnerable operation results in a time of fault (TOF) bug based on performing a fault-tolerance mechanism.

8. The apparatus of claim 7, wherein the record indicates that the vulnerable operation is protected by the fault-tolerance mechanism.

9. The apparatus of claim 7, wherein the vulnerable operation occurs when the node in the distributed system leaves the shared resource in the flawed state before the node crashes.

10. The apparatus of claim 7, wherein the vulnerable operation occurs when the node in the distributed system recovers as a recovery node after maintaining the shared resource in the flawed state.

11. The apparatus of claim 7, wherein the vulnerable operation comprises executing a write command on the shared resource followed by a read command performed on the shared resource, wherein the write command is performed by a first node in the distributed system, wherein the read command is performed by a second node in the distributed system, and wherein the first node and the second node are different nodes in the distributed system.

12. The apparatus of claim 7, wherein the vulnerable operation comprises executing a write command performed on the shared resource followed by a read command performed on the shared resource, wherein the write command is performed by the node in the distributed system, and wherein the read command is performed by the node after restarting the node.

13. A non-transitory medium configured to store a computer program product comprising computer executable instructions that when executed by a processor of a network element (NE) cause the processor to:

trace an execution of a program in the distributed system to produce a record of the execution of the program, the record indicating states of a state of a shared resource at various times during the execution of the program, the state of the shared resource indicating whether data stored at the shared resource is in an accessible state or in a flawed state based on whether the data is accessible for performing a task by other NEs in the distributed system;

identify a vulnerable operation that occurred during the program execution based on the record indicating that the state of the shared resource changed from the accessible state to the flawed state, the vulnerable operation comprising a sequence of actions excluding a state correction action that restores a state of the shared resource to the accessible state, the vulnerable operation occurring in response to detecting that a shared resource of a plurality of shared resources is in a flawed state and in response to detecting a crash in a node in the distributed system, the crash causing the shared resource to be in the flawed state; and determine that the vulnerable operation results in a time of fault (TOF) bug based on performing a fault-tolerance mechanism.

14. The non-transitory medium of claim 13, wherein the record indicates that the vulnerable operation is protected by the fault-tolerance mechanism.

15. The non-transitory medium of claim 13, wherein the vulnerable operation occurs when the node in the distributed system leaves the shared resource in the flawed state before the node crashes.

16. The non-transitory medium of claim 13, wherein the vulnerable operation occurs when the node in the distributed system recovers as a recovery node after maintaining the shared resource in the flawed state.

17. The non-transitory medium of claim 13, wherein the vulnerable operation comprises executing a write command on the shared resource followed by a read command performed on the shared resource.

* * * * *

UNITED STATES PATENT AND TRADEMARK OFFICE
CERTIFICATE OF CORRECTION

PATENT NO. : 10,860,411 B2
APPLICATION NO. : 15/938841
DATED : December 8, 2020
INVENTOR(S) : Haopeng Liu et al.

Page 1 of 1

It is certified that error appears in the above-identified patent and that said Letters Patent is hereby corrected as shown below:

On the Title Page

On Page two, Other Publications, Column 2, Lines 59-61:
Delete "Kolli, A., et al., "High-Performance Transactions for Persistent Memories," High-Performance Transactions for Persistent Memories, Apr. 2-6, 2016, 13 pages."
And insert -- Kolli, A., et al., "High-Performance Transactions for Persistent Memories," Apr. 2-6, 2016, 13 pages. --

Signed and Sealed this
Twelfth Day of January, 2021

Andrei Iancu
*Director of the United States Patent and Trademark Office*